(12) United States Patent
Acero et al.

(10) Patent No.: US 8,165,870 B2
(45) Date of Patent: Apr. 24, 2012

(54) CLASSIFICATION FILTER FOR PROCESSING DATA FOR CREATING A LANGUAGE MODEL

(75) Inventors: Alejandro Acero, Bellevue, WA (US); Dong Yu, Kirkland, WA (US); Julian J. Odell, Kirkland, WA (US); Milind V. Mahajan, Redmond, WA (US); Peter K. L. Mau, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 771 days.

(21) Appl. No.: 11/054,819

(22) Filed: Feb. 10, 2005

(65) Prior Publication Data
US 2006/0178869 A1 Aug. 10, 2006

(51) Int. Cl.
*G06F 17/21* (2006.01)

(52) U.S. Cl. ............. 704/10; 704/2; 704/235; 704/241; 704/255; 704/256; 704/270; 704/270.1; 704/275; 704/277; 704/4; 704/9; 706/45; 707/104.1; 707/7; 715/201; 715/205; 715/210

(58) Field of Classification Search .............. 707/104.1, 707/7; 704/4, 49, 2, 277, 235, 256, 10, 241, 704/255, 270, 270.1, 275, 9; 706/45; 715/201, 715/205, 210

See application file for complete search history.

(56) References Cited

U.S. PATENT DOCUMENTS

| | | | | |
|---|---|---|---|---|
| 5,267,345 A * | 11/1993 | Brown et al. | ................. | 704/255 |
| 5,293,584 A * | 3/1994 | Brown et al. | ................. | 704/277 |
| 5,682,539 A * | 10/1997 | Conrad et al. | ................... | 704/9 |
| 5,960,447 A * | 9/1999 | Holt et al. | ..................... | 715/201 |
| 6,064,965 A * | 5/2000 | Hanson | ........................ | 704/275 |
| 6,128,595 A * | 10/2000 | Ruber | ........................... | 704/255 |
| 6,182,026 B1 * | 1/2001 | Tillmann et al. | .................. | 704/2 |
| 6,308,151 B1 * | 10/2001 | Smith | ........................... | 704/235 |
| 6,484,136 B1 * | 11/2002 | Kanevsky et al. | ................. | 704/9 |
| 6,578,022 B1 * | 6/2003 | Foulger et al. | .................. | 706/45 |
| 6,694,296 B1 * | 2/2004 | Alleva et al. | .................. | 704/255 |
| 6,782,357 B1 * | 8/2004 | Goodman et al. | ................ | 704/9 |
| 7,089,241 B1 * | 8/2006 | Alspector et al. | ................ | 707/7 |
| 7,251,781 B2 * | 7/2007 | Batchilo et al. | ............... | 715/210 |
| 7,313,528 B1 * | 12/2007 | Miller | ........................ | 704/270.1 |
| 7,584,102 B2 * | 9/2009 | Hwang et al. | ................. | 704/256 |
| 2002/0032564 A1 * | 3/2002 | Ehsani et al. | ................... | 704/235 |
| 2003/0004966 A1 * | 1/2003 | Bolle et al. | ................... | 707/104.1 |
| 2003/0083863 A1 * | 5/2003 | Ringger et al. | .................. | 704/10 |
| 2003/0144846 A1 * | 7/2003 | Denenberg et al. | ........... | 704/277 |
| 2003/0212555 A1 * | 11/2003 | van Santen | ................... | 704/241 |
| 2004/0122656 A1 * | 6/2004 | Abir | ................................. | 704/4 |
| 2005/0060643 A1 * | 3/2005 | Glass et al. | ................. | 715/501.1 |
| 2007/0203707 A1 * | 8/2007 | Carus et al. | .................... | 704/270 |

OTHER PUBLICATIONS

Ponting, K., "Computational Models of Speech Pattern Processing," Springer Publishing, 1997.

(Continued)

*Primary Examiner* — Michael Colucci
(74) *Attorney, Agent, or Firm* — Steven M. Koehler; Westman, Champlin & Kelly, P.A.

(57) ABSTRACT

The method and apparatus utilize a filter to remove a variety of non-dictated words from data based on probability and improve the effectiveness of creating a language model.

20 Claims, 4 Drawing Sheets

OTHER PUBLICATIONS

R. DeMori, & M. Federico, "*Language model adaptation*", In K. Ponting, editor, Computational Models of Speech Pattern Processing, pp. 280-303. Springer Verlag, Berlin, New York, 1999.

S. F. Chen, K. Seymore, & R. Rosenfeld, "*Topic Adaptation for Language Modeling Using Unnormalized Exponential Models*", in Proc. 23$^{rd}$ International Conf. on Acoustics, Speech, and Signal Processing, Seattle, Washington, USA, 1998.

X. Fang, J. Gao, J. Li, H. Sheng, "*Training Data Optimization for Language Model Adaptation*", Eurospeech 2003 Geneva, Switzerland Sep. 1-4, pp. 1485-1488, 2003.

A. McCallum, D. Freitag, & F. Pereira, "*Maximum Entropy Markov Models for Information Extraction and Segmentation*", in Proc. 17th International Conf. on Machine Learning, Morgan Kaufmann, San Francisco, CA, pp. 591-598, 2000.

R. Rosenfeld, "*A Maximum Entropy Approach to Adaptive Statistical Language Modeling*", Computer, Speech, and Language, 10, 1996.

A. Berger, S. Della Pietra, & V. Della Pietra, "*A Maximum Entropy Approach to Natural Language Processing*", Computational Linguistics, 22(1):39-71, 1996.

\* cited by examiner

CLASSIFICATION FILTER FOR PROCESSING DATA FOR CREATING A LANGUAGE MODEL

BACKGROUND OF THE INVENTION

The present invention relates to language models used in language processing. In particular, the present invention relates to creating language models for a desired domain.

Language processing systems such as automatic speech recognition (ASR) often must deal with performance degradation due to errors originating from mismatch between the training, test data and actual domain data. As is well known, speech recognition systems employ an acoustic model and a statistical language model (LM) to provide recognition. Adaptation of acoustic model and language model for ASR has been extensively investigated and shown to improve ASR performance in some cases.

The statistical language model (LM) provides a prior probability estimate for word sequences. The LM is an important component in ASR and other forms of language processing because it guides the hypothesis search for the most likely word sequence. A good LM is known to be essential for superior language processing performance.

Training a LM, however, requires large amount of relevant data, which is usually unavailable for task specific speech recognition systems. An alternative way is to use small amount of domain and/or user specific data to adapt the LM trained with a huge amount of task independent data (e.g., Wall Street Journal) that is much easier to obtain. For example, one may harvest emails authored by a specific user to adapt the LM and improve the email dictation accuracy.

LM adaptation generally comprises four steps. First step includes collecting task specific adaptation data also known and as used herein "harvesting". The second step may include normalization where adaptation data in written form are transformed into a standard form of words that would be spoken. Normalization is especially important for abbreviations, date and time, and punctuations. In the third step, the adaptation data are analyzed and a task specific LM is generated. In the last step, the task specific LM is interpolated with the task independent LM. The most frequently used interpolation scheme is linear interpolation:

$$P_a(w|h) = \mu P_t(w|h) + (1-\mu) P_i(w|h),$$

where w is the word, h is the history, $P_a(w|h)$ is the adapted LM probability, $P_t(w|h)$ is the task specific LM probability, $P_i(w|h)$ is the task independent LM probability, and $\mu$ is the interpolation weight.

Many have focused on comparing adaptation algorithms and/or finding relevant data automatically; however, the quality of the data is also important. For example, all of the harvested email data for the user may not be useful for adapting the LM because there are parts which the user will never dictate such as email headers, long URL, code fragments, included reply, signature, foreign language text, etc. Adapting on all of the harvested data may cause significant degradation in the LM. For instance, the following header is automatically generated by the email client application. Adapting the LM with this text may corrupt the LM.

>From: Milind Mahajan
>Sent: Wednesday, Sep. 1, 2004 5:38 PM
>To: Dong Yu
>Subject: LM Adaptation Filtering out non-dictated text is not an easy job in general. One common way of doing this is to use hand-crafted rules (e.g. a set of regular expressions). This approach has three limitations. First, it does not generalize well to situations, which we have not encountered. For example, you may have a rule to filter out Microsoft Outlook's email header, but that rule may not work with Yahoo email headers. Second, rules are usually language dependent. Porting rules from one language to another almost equals to rewriting the rules. Third, developing and testing rules are very costly.

In view of the foregoing, improvements can be made in processing data for creating a LM. A method that addresses one or more of the problems described above would be helpful.

SUMMARY OF THE INVENTION

A method and system, for example embodied on a computer-readable medium, is provided to remove a variety of non-dictated words from data based on probability and improve the effectiveness of creating a language model. In one embodiment, data which is suitable for creating the language model and data which is not suitable for creating the language model is received. The data is divided into a sequence of text units, and based on a probability each text unit that is suitable for creating the language model is ascertained.

Classifiers having a weighted linear combination of feature values can be used to guide the decision process. Such classifiers are known as linear classifiers. A Conditional Maximum Entropy based classification model is a form of a linear classifier and can be used to ascertain the probability that each text unit is suitable for creating the language model. However, those skilled in the art would recognize that the approach can be used with other forms of linear classifiers such as Perceptron or Support Vector Machines (SVMs) and non-linear classifiers such as Neural Networks.

A wide variety of model parameters or feature set can be used. Exemplary model parameters include those that are independent of normalization of the data and independent of a vocabulary such as the number of tokens in a text unit, or the average number of characters per token in the unit. Other features that can be used can be related to the extent of normalization required, whether the words are found in a vocabulary or lexicon, or comparisons to a task independent language model.

DETAILED DESCRIPTION OF ILLUSTRATIVE EMBODIMENTS

The present invention relates to a system and method for processing data used to create a language model. However, prior to discussing the present invention in greater detail, one illustrative environment in which the present invention can be used will be discussed.

Figure 1:
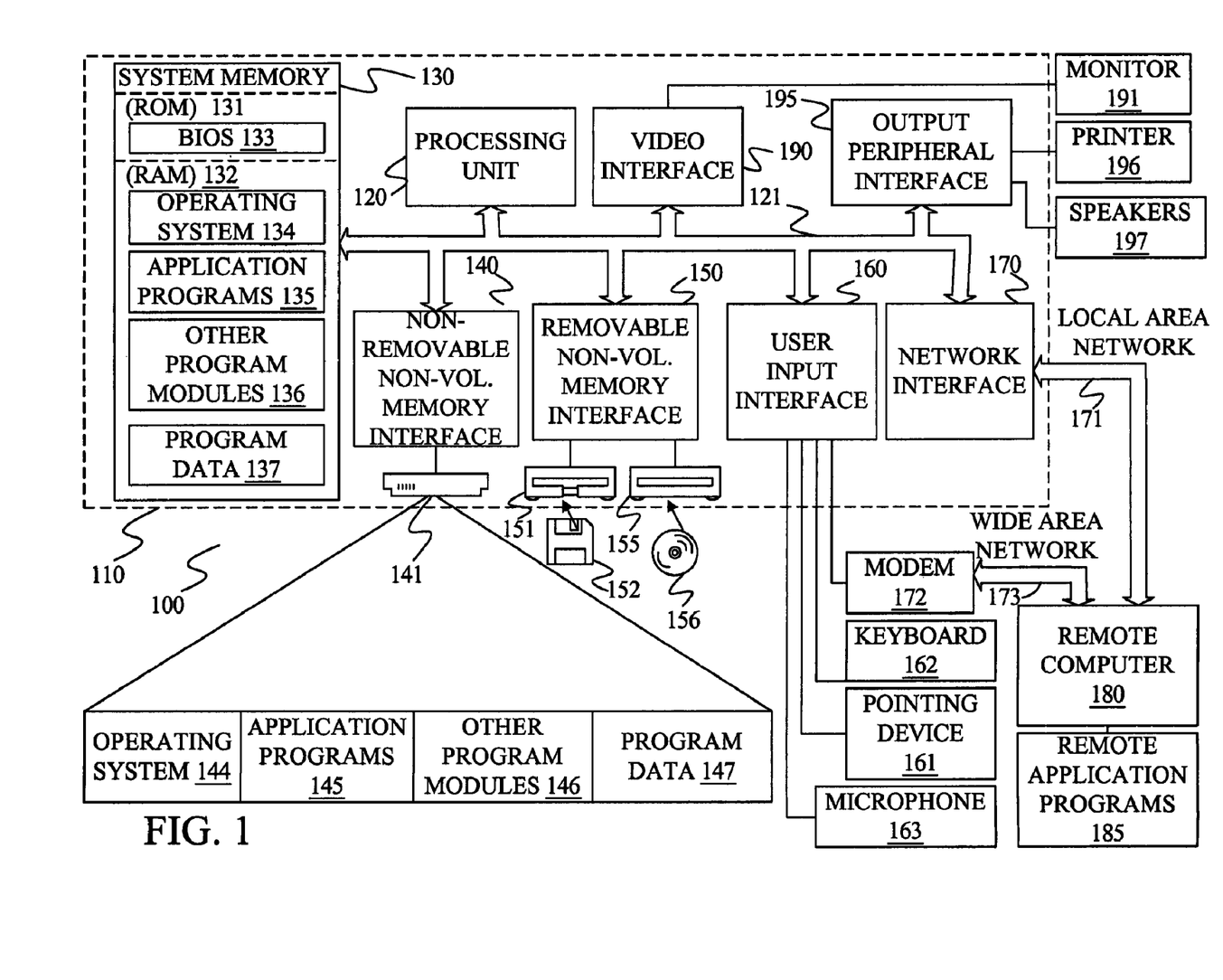
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below.

The invention may also be practiced in distributed computing environments where tasks are performed by remote processing devices that are linked through a communications network. In a distributed computing environment, program modules may be located in both locale and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a locale area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

As indicated above, the present invention relates to a system and method for processing data that can be used for creating a language model. In particular, the system and method described below, which can be implemented with the computing environment described above, uses a filtering approach, for example, based on Conditional Maximum Entropy (MaxEnt) classifier to improve the quality of the data used for creating the language model. In one embodiment, adaptation data is processed. Specifically, the adaptation data is filtered using a classification approach to separate data that should be used for LM adaptation from data that should not be used for LM adaptation. Further processing as is known in the art can then be performed with the adaptation data and other data such as task independent background data to perform language model adaptation. The background section described one form (linear interpolation) of language model adaptation. The filtered adaptation data provided by the method and system described herein, can be used with this form of language model adaptation, but as appreciated by those skilled in the art can also be used with other forms of language model adaptation.

Figure 2:
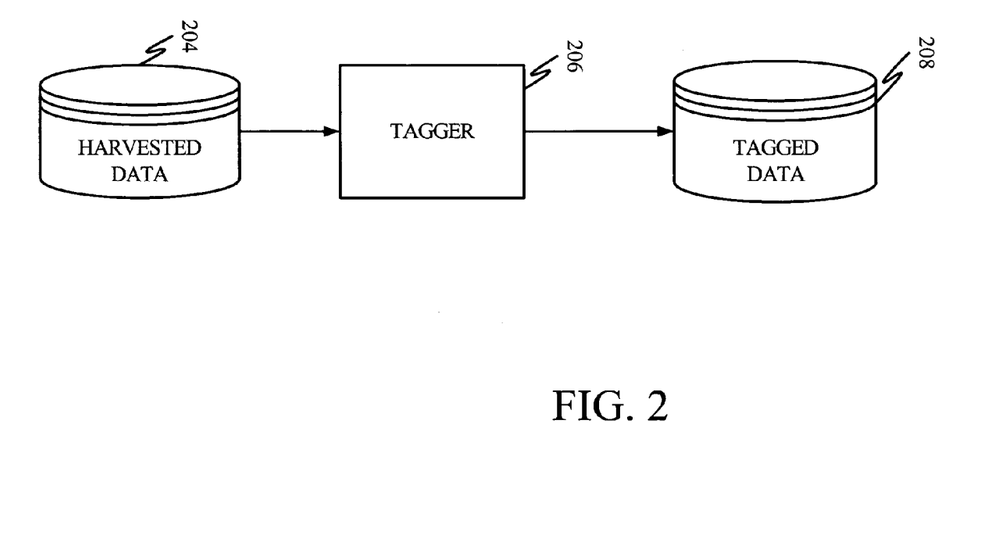
FIG. 2 is a general block diagram of a system for processing data.

FIG. 2 generally illustrates the task to be performed. Harvested potential data 204 having useful data for creating a language model and data not useful is filtered using tagger or classifier 206 using, for example a Maximum Entropy based classification model, to provide at least an indication of data useful for creating the language model, herein represented as tagged data 208. In the embodiment illustrated, tags are associated with text units indicating whether the associated data is useful or not. As appreciated by those skilled in the art, an indication of useful data can be obtained by collecting such data and storing it separate from data that is not useful. The manner of indicating useful data is not critical and as such should not be considered limiting.

The filtering task can be considered as a labeling problem, in other words to segment the data into two categories:
Category D (Dictated text): Text which should be Used for creating the LM; and
Category N (Non-dictated text): Text which should not be used for creating the LM.

In general, data text 204 is divided into a sequence of text units (such as lines). The task of filtering is thus to associate each text unit with a label D for Dictated text or N for Non-dictated text with the following criteria:

$$(l_i \ldots l_n) = \underset{l_i \ldots l_n}{\mathrm{argmax}} P(l_i \ldots l_n | t_i \ldots t_n) \quad (1)$$

where $t_i$ is the text unit i, and $l_i$ is the label associated with $t_i$. The task can be considered as selecting the label sequence that provides the maximum probability. Stated another way, filtering comprises ascertaining based on a probability which text units are suitable for creating the language model.

However, before tagger 206 can be used the filter parameters of the classification model must be trained. A small amount of task specific labeled training data can be used for training the filter parameters. The training data can be labeled using a rule based filter or through a manual annotation tool.

Since filtering of the data 204 is just a small step in creating a language model, the filter has to be very efficient, easy to develop, and easy to port to other languages. To design such a filter, several factors should be considered such as: text unit to use, label dependency modeling across units, general form of the classification model, and the feature set used for classification. Each of these aspects will be discussed below.

The text of data 204 is divided into a sequence of text units, wherein a text unit can comprise a single or a plurality of words. Some natural text units to employ are lines of text (e.g. text separated by new line), windows with fixed number of words per window, and sentences using a sentence breaker.

As indicated above in one embodiment, the text unit used is a line of text. Using line as a unit has three advantages. First, it cleanly breaks out headers, signatures, tables, ASCII art etc. Second, since the line has a visual manifestation, it is likely that people use it naturally to separate out logically related pieces. Third, using a line as the unit would also make it easier to label the training data if manual annotation tool is used.

To simplify implementation of Equation (1) the following assumptions can be employed. As a first assumption, one can assume that the labels of text units are independent with each other such that given the complete sequence of text units, $$P(l_1 \ldots l_n | t_1 \ldots t_n) \approx \Pi_{i=1}^{n} P(l_i | t_1 \ldots t_n). \quad (2)$$

In other words, the model can be state-less. Run-time complexity of state-less models is very low since label probability for each text unit can be computed independently.

As a second assumption, it can be assumed that the label for a given unit depends only upon units in a surrounding window of units:

$$P(l_i | t_1 \ldots t_n) \approx P(l_i | t_{i-k} \ldots t_{i+k}), \quad (3)$$

where k is the window size.

However, in the limit when k=0, the label depends only upon the unit itself:

$$P(l_i | t_1 \ldots t_n) \approx P(l_i | t_i). \quad (4)$$

As indicated above, a Conditional Maximum Entropy (MaxEnt) based classification model can be used such as described in A. McCallum, D. Freitag, & F. Pereira, "*Maximum Entropy Markov Models for Information Extraction and Segmentation*", in Proc. 17th International Conf. on Machine Learning, Morgan Kaufmann, San Francisco, Calif., pp 591-598, 2000; A. Berger, S. Della Pietra, & V. Della Pietra, "*A Maximum Entropy Approach to Natural Language Processing*", Computational Linguistics, 22(1):39-71, 1996; and R. Rosenfeld, "*A Maximum Entropy Approach to Adaptive Statistical Language Modeling*", Computer, Speech, and Language, 10, 1996, all of which are incorporated herein by reference.

The principle of Maximum Entropy states that one should select the unique probability distribution which satisfies all known constraints but does not make any additional assumptions, i.e., maximizes the entropy subject to all known constraints. A MaxEnt model has the form:

$$P(l_i \mid t_i; \overline{\lambda}) \approx \frac{\exp(\overline{\lambda} \cdot \overline{f}(l_i, t_i))}{Z(t_i)}, \quad (5)$$

which is log-linear, where $\overline{\lambda} = \{\lambda_1 \ldots \lambda_m\}$ is the vector of model parameters, $\overline{f}(l_i, t_i)$ is the vector of features on the text unit $t_i$ for label $l_i$, and $Z(t_i)$ is the normalization factor so that the probabilities sum to one.

$$Z(t_i) = \sum_{l_i} \exp(\overline{\lambda} \cdot \overline{f}(l_i, t_i)). \quad (6)$$

Given the feature values and labels on the training set, one can obtain the values for $\overline{\lambda}$ using MaxEnt training algorithm such as the Generalized Iterative Scaling (GIS) algorithm as described in J. N. Darroch, & D. Ratcliff, "*Generalized iterative scaling for log-linear models*", The Annals of Mathematical Statistics, 43(5), 1470-1480, 1972, which is hereby incorporated herein by reference.

Once the model parameters have been determined, the model can be used to label (or filter) the text. First, the text is segmented into a sequence of text units. Features are then extracted for each text unit to obtain $P(l_i|t_i;\overline{\lambda})$. After that, a simple threshold can be used to decide whether to label the text unit as D (Dictated) or N (Non-Dictated). In other words, whether the text unit is accepted is determined by:

$$l_i = \begin{cases} D, & \text{if } P(D \mid t_i; \overline{\lambda}) > P_{thresh} \\ N, & \text{otherwise} \end{cases}, \quad (7)$$

where $P_{thresh}$ is the threshold. In one embodiment, a threshold of 0.5 provides suitable results whereas the performance does not change much if the threshold is in the range of [0.4-0.6]. Note that $P(D|t_i;\overline{\lambda}) > P_{thresh}$ can be simplified to $\overline{\lambda} \cdot \overline{f}(D,\overline{t}) - \overline{\lambda} \cdot \overline{f}(N,\overline{t}) >$ threshold. Here $\overline{t}$ represents a sequence of one or more text units. Threshold can be computed from $P_{thresh}$, $\overline{f}(D,\overline{t})$, $\overline{f}(N,\overline{t})$ and $\overline{\lambda}$. Classifiers such as this which use a weighted linear combination of feature values to guide the decision are known as linear classifiers. Even though the approach is described in terms of a Conditional Maximum Entropy classification model, those skilled in the art would recognize that the approach can be used with other forms of linear classifier such as Perceptron or Support Vector Machines (SVMs) and non-linear classifiers such as Neural Networks.

Referring now to the feature set, the feature set used affects the filter performance. In addition, a feature set that is inexpensive to compute and/or language independent, and yet effective enough to classify text units is advantageous.

A list of computable exemplary features which might be useful is provided below. Since text normalization is commonly an integral part of LM creation, features which depend on normalization are included. In the list below, "tokens" are used which refer to words, but also could refer to non-word elements that can be dictated or spoken such as monetary amounts, dates, time, etc. In addition, normalization also includes providing spoken words for punctuation marks contained in the unit such as commas, periods, parentheses, question marks, etc.

Figure 3A:
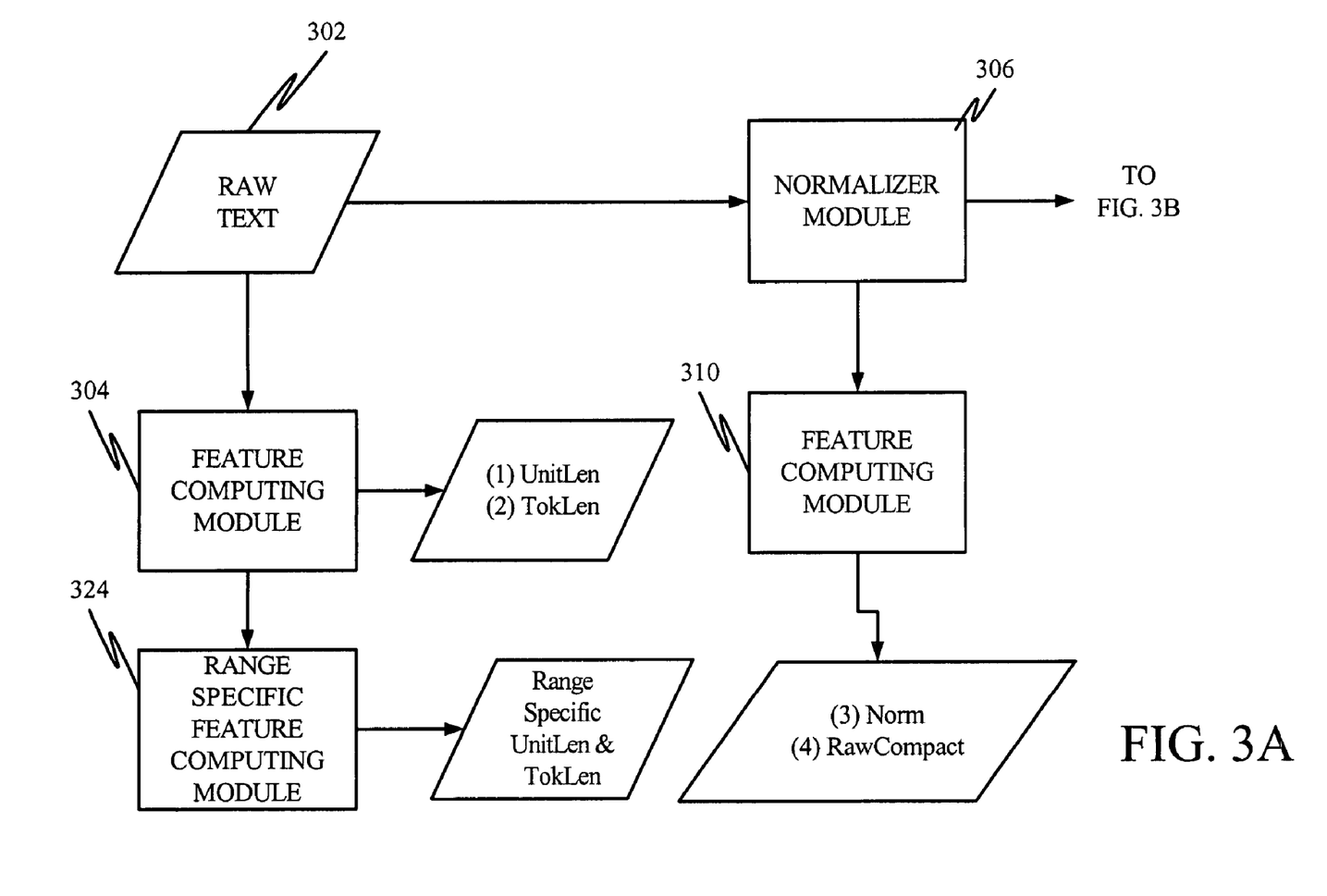
FIGS. 3A and 3B illustrate a block diagram of a system for computing exemplary features.
Figure 3B:
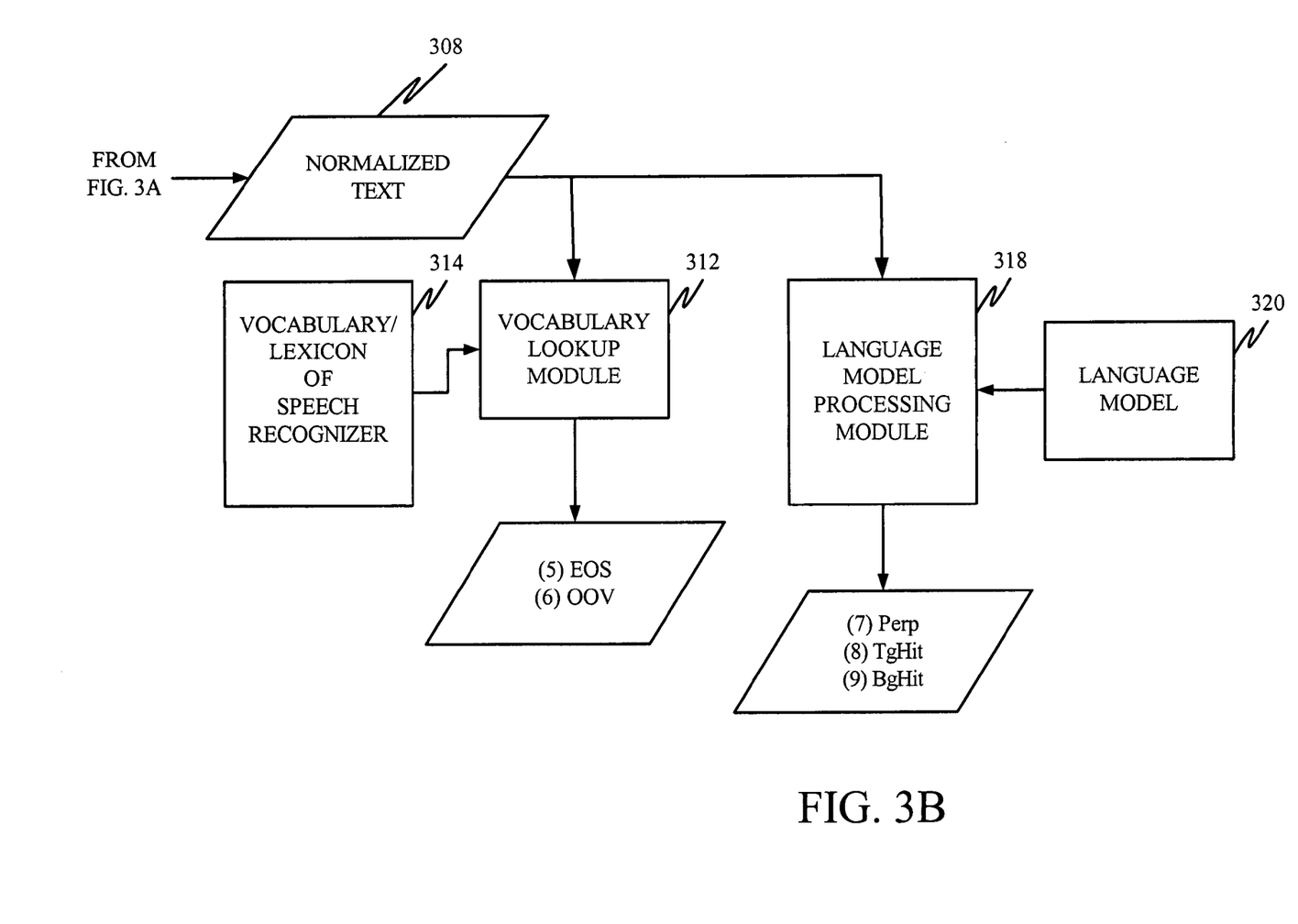

Referring also to FIG. 3, processing of the harvested or raw text will also be described. The harvested or raw text is indicated at 302. At this point, the first two features relating to qualities of the tokens in the unit, which do not require normalization and are independent of the vocabulary used therein can be calculated. As schematically illustrated as being calculated by module 304, the calculated features are:
(1) UnitLen: the number of tokens in the unit. Token is determined by the word breaker. For example in English, this can be simply determined with the space delimiter.
(2) TokLen: the average number of characters per token in the unit.

The raw text 302 is then commonly normalized by a normalizing module 306 to provide normalized text 308.

From the normalized text 308, module 310 schematically illustrates calculation of the next two features, which are related to the normalization process:
(3) Norm: the percentage of the tokens in the raw text which require normalization.
(4) RawCompact: the ratio of the number of tokens in the raw text of the unit to the number of words in the normalized text for the unit.

Other features can be calculated from the normalized text 308. For instance, a vocabulary look-up module 312 uses a vocabulary or lexicon 314 of a speech recognizer to be used in order to calculate the next two features related to the vocabulary or lexicon:
(5) EOS: the percentage of words in the normalized text which are end-of-sentence words (e.g. period, question mark, exclamation point, etc.).
(6) OOV: the percentage of words in the normalized text which are Out Of Vocabulary (i.e. not in the lexicon).

If desired, a language model processing module 318 can use the normalized text 308 to form trigrams, bigrams, etc. from the normalized text and look them up in a language model 320 to see if there are matches. From this process, the next three features related to comparisons made to a task independent LM, can be calculated; however typically this process can be computational intensive:
(7) Perp: the perplexity of the normalized text using the task independent LM.
(8) TgHit: the percentage of trigrams in the normalized text which are present in the task independent LM.
(9) BgHit: the percentage of bigrams in the normalized text which are present in the task independent LM.

At this point it should be noted that each feature listed above or other features can be dual valued (i.e. a value for text that should be used for creating a language model and a value for text that should not be used for creating the language model) or single value where only one value is provided for either text that should be used for creating the language model or a value for text that should not be used for creating the language model.

Also, depending in part upon the application to which the LM is intended, the minimum set of features considering the cost-benefit trade-off can be determined with experiments.

Although the features values described above can be directly in the model (which is also known as using continuous values), in another embodiment one or more of the features can be modified so to create a set of binary features, each of which would have a binary value. This technique of processing the feature values as a function of a specific range is also known as "bucketing." As an example, if a feature such as a percentage takes values in the range 0-100, the set of binary or "bucketed" features can be assigned a range such as 0-10, 10-20, . . . 90-100. Then, the feature value calculated is compared to each binary feature of the set of binary features to determine if the binary feature takes a value 0 or 1 depending on whether the value fell in the bucket or range. In other words, a feature f(l,t) bucketed by range [x,y] results in bucket feature:

$$f_{x-y}^b(l,t)=\delta(x \leq f(l,t) < y) \quad (8)$$

In FIG. 3, module 324 exemplifies calculation of binary values for each feature in the set of binary or range specific features for UnitLen and TokLen. Similar modules can be used for the other continuous features.

Use of range specific or binary features easily increases the number of features albeit the values can be 1 or 0. Using the continuous value results in less number of features but introduces some a-priori assumptions into the model. Use of bucketing gives more control over the assumptions which go into the treatment of feature values.

In experiments, bucket end-point values were selected heuristically. So, for all percentage valued features, the bucket end points are: 1, 5, 10, 20, 40, 60, 80, 90, 95, 99. This creates the buckets: 0-1, 1-5, 5-10 etc. Finer bucketing at the extremes of the range is used based upon the assumption that finer granularity there is likely to be more important than say in the range between 40-60 for example.

It should be noted there is a trade-off involved in bucketing. Finer granularity has the potential of giving more control. However, that needs to be balanced against noisier estimation of the parameter value given data sparseness. An alternative way for doing this automatically is to select buckets based on percentile based (such as decile) threshold values.

The foregoing has described using continuous value features as well as bucketed or binary features, the latter of which increases the number of features. As another technique, feature induction can be used to increase the number of features in order to provide more classifying information. In general, feature induction to create new features is useful to compensate for the limitations of the linear classifier. In one embodiment, a specific form of feature induction which is equivalent to splitting or partitioning the space of text units into subspaces or ranges and creating a separate classifier for each sub-space with all of the underlying features can be used.

More specifically, each feature of the form f(l,t) can be expanded into multiple features by using the length of the text unit (UnitLen) for partitioning. For example, the feature TokLen can be expanded as a function of the length (i.e. number of tokens) of the text unit into the set:

$$f_{*-4}(l,t)=f(l,t)*\delta(0 \leq \text{UnitLen}(t)<4)$$

$$f_{4-8}(l,t)=f(l,t)*\delta(4 \leq \text{UnitLen}(t)<8)$$

$$f_{8-16}(l,t)=f(l,t)*\delta(8 \leq \text{UnitLen}(t)<16)$$

$$f_{16-*}(l,t)=f(l,t)*\delta(16 \leq \text{UnitLen}(t)) \quad (9)$$

where $$\delta(x) = \begin{cases} 1, & \text{if } x = \text{true} \\ 0, & \text{otherwise} \end{cases}$$

For instance, if the continuous value f(l,t) was 5 for TokLen, but the length of the unit was 10 then the set of feature values for the unit length ranges would be (0, 0, 5, 0). Module 324 can represent this form of feature processing as well, wherein the ranges comprise text unit ranges.

As a heuristic rationale for this technique it is noted that since all of the feature values are normalized by a measure of the unit length, it is possible that the feature values of smaller units are likely to be noisier than those for the longer units. Introducing features in this form, provides the model some flexibility to make allowances for the noise or uncertainty of smaller units, in favor of those of longer lengths.

In summary, removing non-dictated text from the text used to create a language model is important to improving the effectiveness of LM. The classification approach such as the Maximum Entropy based generic filter described above processes data effectively to improve recognition. Filtering out the non-dictated text prevents corruption of the LM. This improves the effectiveness of the LM. However, removing some of the text from the data decreases the size of the data. This usually causes data sparseness problem, which can make the LM probability estimation less accurate and would decrease the effectiveness of the LM. Filtering parameters can be adjusted to balance these competing factors.

The present invention can be used in the context of LM adaptation; however, workers skilled in the art will recognize that it can also be used to filter the training data for creating a task or domain-independent LM as well. This would be particularly useful if the LM training data contains a significant amount of irrelevant material and it is expensive to come up with rule-based classifier to clean it up. For example, if instead of getting task-independent training data from a newspaper where it is likely to be in a uniform format and easy to clean using rules, it was obtained by crawling various web sites, the filtering process will be difficult and would benefit from a similar approach.

Although the present invention has been described with reference to particular embodiments, workers skilled in the art will recognize that changes may be made in form and detail without departing from the spirit and scope of the invention.

What is claimed is:

1. A computer-implemented method of processing textual adaptation data for creating a statistical language model that provides prior probability estimates for word sequences, the method comprising, with a computer:
    receiving textual adaptation data comprising textual data which is suitable for creating the statistical language model and non-dictated textual data which is not suitable for creating the statistical language model;
    segmenting the textual adaptation data into a sequence of units;
    extracting a first set of features for each unit in the sequence;
    normalizing the sequence of units to form a normalized sequence of units;
    extracting a second set of features for each unit in the normalized sequence of units;
    processing the data using a processor operating as a classifier to filter out the non-dictated textual data from the textual adaptation data, thereby identifying at least the textual data suitable for creating the language model, the processing including using a classification model which uses a combination of the first and second sets of features;
    outputting the textual data suitable for creating the statistical language model; and
    generating the statistical language model from the suitable data, wherein the statistical language model provides prior probability estimates for word sequences to guide a hypothesis search for a likely intended word sequence.

2. The computer-implemented method of claim 1 wherein processing includes using a linear classifier based classification model wherein the first set of features is based at least in part on a number of tokens and a number of characters in the sequence of units, and wherein the second set of features is based at least in part on a percentage of tokens requiring normalization in the normalized sequence of units.

3. The computer-implemented method of claim 1 wherein extracting the first and second sets of features includes computing a feature of the classification model that is independent of a vocabulary.

4. The computer-implemented method of claim 3 and further comprising:
tokenizing the sequence of units; and
wherein the feature of the classification model comprises at least one of a number of tokens and an average number of characters per token.

5. The computer-implemented method of claim 1 wherein normalizing the sequence of units comprises providing words that would be spoken for portions of the textual adaptation data that do not comprise words, the portions of the textual adaptation data including punctuation marks and numeric elements.

6. The computer-implemented method of claim 1 wherein segmenting comprises:
utilizing a word breaker to segment the textual adaptation data into a sequence of units.

7. The computer-implemented method of claim 1 and further comprising:
utilizing a lexicon to extract a third set of features for each unit in the normalized sequence of units; and
wherein processing includes processing the data by also using the third set of features in the classification model.

8. The computer-implemented method of claim 7 wherein one of the features in the third set of features includes a percentage of words in the normalized sequence of units that are end-of-sentence words, and wherein a second one of the features in the third set of features includes a percentage of words in the normalized sequence of units that are not in the lexicon.

9. The computer-implemented method of claim 1 and further comprising:
utilizing a task independent language model to extract a third set of features for each unit in the normalized sequence of units; and
wherein processing includes processing the data by also using e third set of features in the classification model.

10. The computer-implemented method of claim 9 wherein one of the features in the third set of features includes a perplexity of the normalized sequence of units, wherein a second one of the features in the third set of features includes a percentage of trigrams in the normalized sequence of units that are present in the task independent language model, and wherein a third one of the features in the third set of features includes a percentage of bigrams in the normalized sequence of units that are present in the task independent language model.

11. The computer-implemented method of claim 1 wherein extracting the first and second sets of features includes computing at least some of the features in terms of specific ranges.

12. A computer-readable storage medium having computer-executable instructions for performing steps to process textual adaptation data for creating a statistical language model that provides prior probability estimates for word sequences, the instructions comprising:
receiving textual adaptation data comprising textual data which is suitable for creating the statistical language model and non-dictated textual data which is not suitable for creating the statistical language model;
dividing the textual adaptation data into a sequence of text units;
utilizing a lexicon to extract a first set of features for each text unit in the sequence;
utilizing a task independent language model to extract a second set of features for each text unit in the sequence;
using a classification model which uses a combination of the first and second sets of features to filter out the non-dictated textual data from the textual adaptation data, thereby ascertaining whether each text unit is suitable for creating the statistical language model; and
generating the statistical language model from the suitable text units, wherein the statistical language model provides prior probability estimates for word sequences to guide a hypothesis search for a likely intended word sequence.

13. The computer-readable storage medium of claim 12 wherein using a classification model includes using a conditional maximum entropy classification model, and wherein utilizing the lexicon comprises determining a percentage of words that are end-of-sentence words and determining a percentage of words that are not in the lexicon.

14. The computer-readable storage medium of claim 12 wherein using a classification model comprises using at least one of a Perceptron classifier and a Support Vector Machines classifier, and wherein utilizing the task independent language model comprises determining a perplexity of the sequence of text units, determining a percentage of trigrams that are present in the task independent language model, and determining a percentage of bigrams that are present in the task independent language model.

15. The computer-readable storage medium of claim 12 wherein each text unit comprises a plurality of words, and wherein the method further comprises bucketing the first and second sets of features into ranges, and utilizing the ranges in the classification model.

16. The computer-readable storage medium of claim 15 wherein each text unit comprises a line of text, and wherein the classification model uses a weighted linear combination of the ranges.

17. The computer-readable storage medium of claim 12 and further comprising normalizing the textual adaptation data to provide words that would be spoken for portions of the textual adaptation data that do not comprise words, the portions of the textual adaptation data including punctuation marks and numeric elements.

18. The computer-readable storage medium of claim 17 wherein ascertaining includes computing a feature of the classification model for the text units of the textual adaptation data that is independent of normalization of the textual adaptation data and independent of a vocabulary.

19. The computer-readable storage medium of claim 17 wherein ascertaining includes computing a feature of the classification model for the text units of the textual adaptation data that is based on at least one of normalization of the textual adaptation data and comparison to a vocabulary.

20. A computer-readable storage medium having computer-executable instructions for performing steps to process textual adaptation data for creating a statistical language model that provides prior probability estimates for word sequences, the instructions comprising:
receiving textual adaptation data comprising textual data which is suitable for creating the statistical language model and non-dictated textual data which is not suitable for creating the statistical language model;

dividing the textual adaptation data into a sequence of non-normalized text units;

extracting a first set of features for each text unit in the sequence of non-normalized text units;

normalizing the sequence of non-normalized text units to form a normalized sequence of text units;

extracting a second set of features for each text unit in the normalized sequence of text units utilizing a lexicon;

extracting a third set of features for each text unit in the normalized sequence of text units utilizing a task independent language model;

using a classification model which uses a combination of the first, second, and third sets of features to filter out the non-dictated textual data from the textual adaptation data, thereby ascertaining whether each text unit is suitable for creating the statistical language model; and generating the statistical language model from the suitable text units, wherein the statistical language model provides prior probability estimates for word sequences to guide a hypothesis search for a likely intended word sequence.

* * * * *